Dec. 9, 1924.   1,518,275
W. D. ROOT
LIQUID DISPENSING DEVICE
Filed May 31, 1922   2 Sheets-Sheet 1
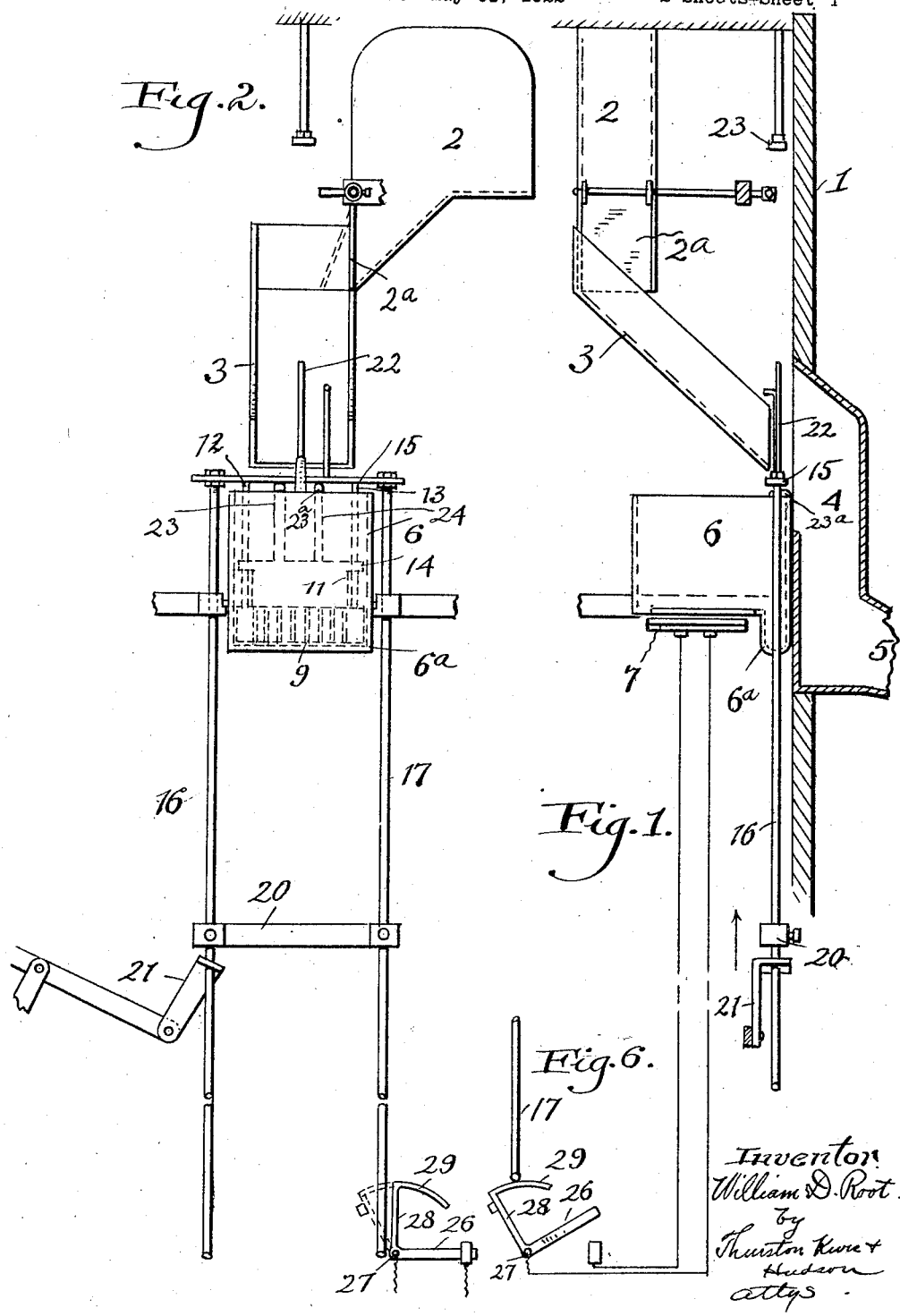

Dec. 9, 1924.
W. D. ROOT
LIQUID DISPENSING DEVICE
Filed May 31, 1922   2 Sheets-Sheet 2
1,518,275
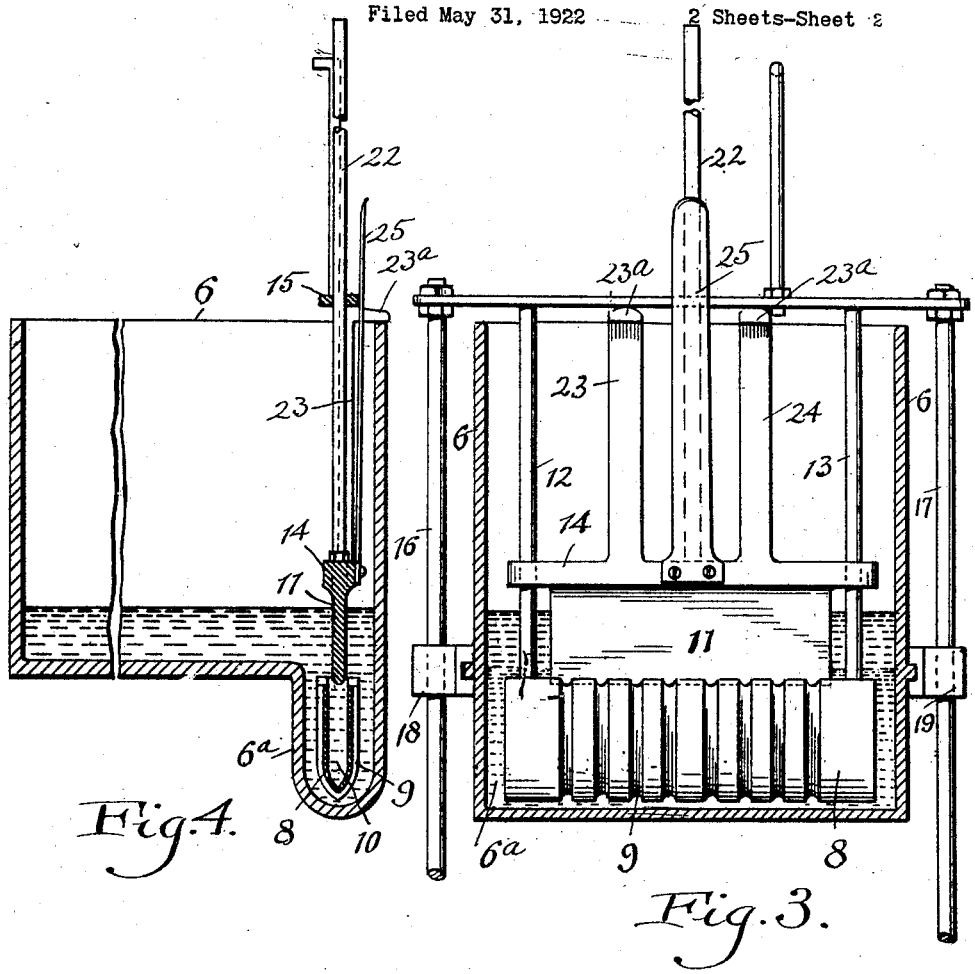
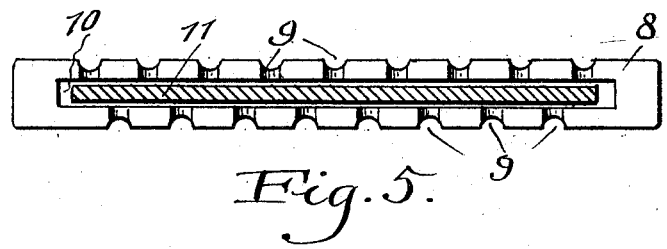
Inventor,
William D. Root
by Thurston Kwis & Hudson
attys Patented Dec. 9, 1924.

1,518,275

UNITED STATES PATENT OFFICE.

WILLIAM D. ROOT, OF CLEVELAND, OHIO, ASSIGNOR TO THE MACHINERY IMPROVEMENT COMPANY, OF CLEVELAND, OHIO, A CORPORATION OF OHIO.

LIQUID-DISPENSING DEVICE.

Application filed May 31, 1922. Serial No. 564,691.

*To all whom it may concern:*

Be it known that I, WILLIAM D. ROOT, a citizen of the United States, residing at Cleveland, in the county of Cuyahoga and State of Ohio, have invented a certain new and useful Improvement in Liquid-Dispensing Devices, of which the following is a full, clear, and exact description.

The present invention relates to a buttering device which is adapted and intended to be used in connection with a popcorn dispensing machine or a machine of similar character and use.

The object of the invention is to provide a construction for the buttering device which will operate in timed relation to the delivery or discharge from the machine of a definite quantity of popcorn, and will discharge butter onto the popcorn as it is being discharged so that the butter is equally distributed to the popcorn as it moves.

Reference should be had to the accompanying drawings forming a part of this specification, in which Fig. 1 is a sectional elevation of a portion of an automatic popcorn machine in which the buttering device forming the present invention is used; Fig. 2 is a front elevation of the buttering device and associated and cooperating parts; Fig. 3 is a sectional elevation of the buttering device; Fig. 4 is a sectional elevation taken at right angles to that shown at Fig. 3; Fig. 5 is a plan view of a portion of the buttering device with parts in section. Fig. 6 shows in elevation an open switch.

Referring to the drawings, 1 indicates a portion of a housing or cabinet enclosing a popcorn machine, and inasmuch as the popping mechanism and raw corn feeding mechanisms are no part of the present invention, they are omitted from the drawing and from this specification.

At 2 there is indicated a storage reservoir in which popped corn is retained, this reservoir being of sufficient size to store a quantity of popped corn which will represent one bag of popcorn of the size usually used in dispensing popcorn.

The popcorn which is so stored is delivered from the receptacle 2 to an inclined chute or delivery member 3, and from the chute or delivery member it is delivered into an outside casing 4 which has an opening 5 at the lower part thereof, through which the discharged popcorn may be fed into a bag or other receptacle held at the opening 5 to receive the popcorn.

The storage reservoir 2 has an opening at the lower portion thereof which is controlled by a gate 2$^a$, this gate being operated by any suitable mechanism and may be operated by a coin controlled mechanism of any desired type. As the corn passes from the end of the chute or delivery member 3 into the outside receptacle or box-like member 4, butter is supplied to the same by means of the device which is about to be described.

This buttering device comprises a receptacle 6 which is adapted to contain butter, and the butter is maintained in its melted condition by means of any suitable heating device, such for instance as an electric heating device indicated at 7 in the drawing.

The receptacle 6 adjacent the forward end thereof has a well 6$^a$ which extends transversely with respect to the reservoir 6.

Co-operating with the reservoir 6 is a butter dispensing device which comprises a head member or carrier 8, and this head member is upon its outer surface provided with a plurality of grooves such as indicated at 9. The head member or carrier has an open ended chamber or central opening, as indicated at 10, and within this opening there is a blade or plunger 11 which is free to move in this chamber 10, and is approximately of the same size as the chamber, except that liberal clearance is left between the blade and the side walls of the chamber and the end walls of the chamber. The head member or carrier 8 is secured to two rods 12 and 13, and the blade or plunger 11 is carried upon a cross member 14 which has openings through which the rods 12 and 13 extend so that the rods mentioned also serve as guides for the blade or plunger 11.

The rods 12 and 13 are at their upper ends secured to a cross member 15, and this cross member at its opposite end is secured to operating rods 16 and 17. These rods may be suitably guided by passing through ears 18 and 19 carried on the reservoir 6, and if desired, by other guiding means such as indicated at 20 in Fig. 2. These rods 16 and 17 may be operated to raise and lower the same in any desired manner, and for the purpose there is shown a lever 21 which may be operated in any suitable manner. As the rods 16 and 17 are raised they will carry the cross member 15 and the rods 12 and 13 in an upward direction, thus raising the head member 6, and also raising the blade or plunger 11, which as before stated, is mounted to reciprocate on the rods 12 and 13. The movement of the rods 16 and 17 is sufficient to carry the head member or carrier 8 above the end of the chute or delivery member 3, so that the popcorn which is discharged through the chute or delivery member 3 will, when the head member or carrier is elevated pass beneath the head member.

The blade member 11 has secured to it a rod 22 which extends upwardly, and this blade is adapted to cooperate with a stop member 23 which is situated above the chute or delivery member 3 and in the path of movement of the rod 22. When the head member or carrier 8 is elevated to its proper height in accordance with the movement of the rods 16 and 17, the end of the rod 22 will engage with the members 23 just before the head member reaches the highest point of its travel, and in doing this it will move the blade 11 into the head member or carrier 8.

As will be clearly seen from Fig. 4 of the drawing, when the head member 8 is within the receptacle 6, it will be positioned within the well portion 6ª, and melted butter within the receptacle 6 will cover the head member 8 and completely fill the chamber 10 within the same. As the head member or carrier 8 is elevated, the butter which is within the chamber 10 will be retained therein and there will be a certain amount of the melted butter dripping from the head member or carrier 8 as it is raised.

When the head member or carrier 8 reaches its highest point of elevation, and the blade or plunger 11 is pushed into the chamber 10, as before described, the butter within the chamber will be displaced and flow over the top of the head member or carrier 8, and through the grooves 9, dripping from the under side of the member 8. The dripping butter will, unless otherwise disposed of, drip back into the receptacle 6, but when popcorn is discharged through the chute or delivery member 3, the popcorn will pass directly through the dripping butter and will take up the butter. The arrangement as to the movement of the blade or plunger 11 into the chamber 10 is such that there will be displacement of butter and consequent dripping of butter from the head or carrier 8 just preceding and during the entire period of discharge of popcorn through the chute or delivery member 3 so that all the popcorn which passes beneath the head member or carrier 8 when the same is in elevated position, will receive the dripping butter as it passes from the chute or delivery member 3 into the outside receptacle 4. When this operation is complete the head member 8 and the blade 11 descend.

The upper portion of the blade member 11 is provided with upstanding fingers 23 and 24 which at their upper ends are provided with outwardly extending portions. such as represented at 23ª in Fig. 4.

As the member 8 and the slide 11 descend these extensions 23ª will engage with the forward edge of the receptacle, thus retaining the member 11 from further descending movement, while the head member 8 will descend further and until the cross member 15 engages with the outwardly extending end portions of the fingers 23 and 24, which marks the limit of movement for the head member 8.

In order to keep the blade 11 from moving with respect to the head member 8, except in the manner which has been described, there is a spring 25 which is secured to the upper portion of the blade or plunger 11, and which bears upon the cross member 15. The frictional engagement between the spring and the cross member 15 will prevent any dropping or sliding of the member 11 with respect to the head 8 except when the blade member 11 is positively moved because of the engagement between the stop member 23 and the rod member 22, or the engagement between the edge of the reservoir 6 and the extensions on the fingers 23 and 24.

In an automatic dispensing machine in which the buttering device is more particularly intended to operate, the relationship between the movement of the head member 8 and the discharge of popcorn through the chute or delivery member 3 is such that the member 8 is elevated above the chute, just before popcorn is discharged therethrough, and continues in its elevated position above the chute and discharging butter until the passage of the popcorn through the chute 3 is completed.

As before stated, any butter which drips from the head member 8 and which is not taken up on the popcorn, merely drips back into the reservoir 6, and therefore is not lost.

The heating member 7 by which the material within the receptacle 6 is heated, is controlled by means of a knife switch 26 which is pivoted as indicated at 27. This knife switch has an upstanding arm 28 with an arc-shaped portion 29. In order to shut off the electricity which is used to energize the heating member 7, that is to say, in order to move the switch to inoperative position, it is necessary that the rods 16 and 17 be elevated, which in turn means that the butter carrier is in its elevated position. This will be seen by more particular inspection of the lower portion of Fig. 2 and Fig. 6.

When the rods 16 and 17 are in their lowermost position the switch member must remain closed because it can not be opened due to the fact that the rod 17 prevents movement of the arm 28 to the extent that would be necessary in opening the switch.

On the other hand, as shown in Fig. 6, with the rods 16 and 17 in upper position, the switch member may be opened and it will be prevented from returning to its lowermost position by engagement between the arc-shaped portion 29 and the lower end of the rod 17. Therefore, the butter carrier will be held in elevated position when the current to the heating element 7 is turned off.

This is purposeful inasmuch as it is undesirable to leave the butter carrier immersed in the butter after operation of the machine ceases, because the butter will harden and will make it very difficult for the mechanism which ordinarily reciprocates the rods 16 and 17 to elevate the butter carrier when encrusted in the solidified butter.

When the machine is started the switch 26 may be moved to closed position, which will cause the heating element 7 to function and start to melt the butter in the receptacle 6. The butter carrier will drop down and rest on the top of the solid butter until such time as the butter is melted, when it will become immersed in the liquid butter in the manner which has before been described.

While the dispensing apparatus which has been herein described is particularly intended and adapted for use in connection with a popcorn dispensing machine, it will be understood that it may be used under other conditions where a liquid or fluid substance is dispensed so as to drip upon another substance which moves beneath an elevated carrier from which the liquid is dripping.

Having described my invention, I claim:—

1. A dispensing apparatus comprising a reservoir adapted to contain a liquid material, a carrier normally positioned in the reservoir to be immersed in the liquid, a delivery member above the reservoir, and means by which the carrier is raised to a position above the delivery member to discharge liquid directly upon material moving over the delivery member.

2. A dispensing apparatus comprising a reservoir adapted to contain a liquid material, a carrier normally positioned in the reservoir to be immersed in the liquid, a delivery member above the reservoir, means by which the carrier is raised to a position above the delivery member, and means for expelling liquid from the carrier when the same is in raised position thereby to discharge liquid directly upon the material moving over the delivery member.

3. A dispensing apparatus comprising a reservoir adapted to contain a liquid material, a carrier normally positioned in the reservoir to be immersed in the liquid, a delivery member above the reservoir, means by which the carrier is raised above the delivery member, and means for expelling liquid from the carrier when the carrier is above the delivery member thereby to discharge liquid upon material moving over the delivery member.

4. A dispensing apparatus comprising a reservoir adapted to contain a liquid material, a carrier normally positioned in the reservoir to be immersed in the liquid, a delivery member above the reservoir, means by which the carrier is raised above the delivery member, a plunger associated with the carrier and adapted to enter the carrier and expel liquid therefrom, and means for operating said plunger when the carrier is above the delivery member.

5. A dispensing apparatus comprising a reservoir adapted to contain a liquid material, a hollow carrier normally positioned in the reservoir to be immersed in the liquid, a delivery member above the reservoir, means by which the carrier is raised above the delivery member, a plunger associated with the carrier and movable therewith, and means for independently moving the plunger when the carrier is above the delivery member whereby the plunger enters the carrier and expels the liquid therefrom to discharge the same upon material moving over the delivery member.

6. A dispensing apparatus comprising a reservoir adapted to contain a liquid material, a carrier normally positioned in the reservoir to be immersed in the liquid, said carrier being hollow, a plunger mounted on the carrier and normally above the carrier said plunger being movable with the carrier but capable of independent movement, means by which the carrier is raised above the delivery member, and means for engaging the plunger when the carrier is above the delivery member to move said plunger into the carrier and thereby expel the liquid therefrom to discharge the same upon material moving over the delivery member.

7. A dispensing apparatus comprising a reservoir adapted to contain a liquid material said reservoir having adjacent one end a depending well portion, a carrier normally positioned in the well portion of said reservoir, said carrier being hollow and provided with parallel grooves on the outer side surfaces, means by which said carrier may be elevated above the reservoir and in alignment therewith, and a plunger member adapted to co-operate with the carrier and to enter said carrier to expel the contents of the carrier.

8. A dispensing apparatus comprising a reservoir adapted to contain a liquid material, a carrier normally positioned in the reservoir to be immersed in the liquid, said carrier being hollow, a plunger member associated with the carrier and slidably mounted thereon, means for elevating the carrier and plunger together, means engaging with the plunger when the carrier is elevated to push the plunger into the carrier, and means for withdrawing the plunger from the carrier when the carrier moves to its position within the reservoir.

9. A dispensing apparatus comprising a reservoir adapted to contain a liquid material, a hollow carrier normally positioned in the reservoir to be immersed in the liquid, a plunger member adapted to co-operate with said carrier which plunger member is slidably mounted upon the carrier, means for elevating the carrier and plunger together, means for operating the plunger to cause it to enter the hollow carrier when the carrier is moved above the reservoir, and a member carried by the side and adapted to engage with the edge of the reservoir when the carrier descends into the reservoir to withdraw the plunger from the carrier.

10. A dispensing apparatus comprising a reservoir adapted to contain a liquid material, a carrier normally positioned in the reservoir to be immersed in the liquid, a delivery member above the reservoir, said delivery member having an end portion from which the material moving over the same is discharged, and means by which the carrier is raised above the delivery member to discharge liquid from the carrier directly upon the material as it is discharging from said delivery member.

In testimony whereof, I hereunto affix my signature.

WILLIAM D. ROOT.